(12) United States Patent
Pan (10) Patent No.: US 7,116,705 B2
(45) Date of Patent: Oct. 3, 2006

(54) METHOD AND APPARATUS FOR REDUCING THE PROCESSING RATE OF A CHIP-LEVEL EQUALIZATION RECEIVER

(75) Inventor: Jung-Lin Pan, Selden, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

(21) Appl. No.: 11/210,591

(22) Filed: Aug. 24, 2005

(65) Prior Publication Data

US 2006/0098717 A1 May 11, 2006

Related U.S. Application Data (60) Provisional application No. 60/625,870, filed on Nov. 8, 2004.

(51) Int. Cl.
*H04B 1/69* (2006.01)
*H04B 7/216* (2006.01)

(52) U.S. Cl. .................................. 375/149; 370/342

(58) Field of Classification Search ................ 375/130, 375/140, 147, 148, 150, 152, 259, 260, 267, 375/316, 346, 347; 370/310, 320, 335, 328, 370/329, 342, 441, 334
See application file for complete search history.

(56) References Cited

U.S. PATENT DOCUMENTS

| | | | |
|---|---|---|---|
| 6,097,712 A * | 8/2000 | Secord et al. .............. 370/335 |
| 6,377,613 B1 * | 4/2002 | Kawabe et al. ............. 375/142 |
| 6,430,235 B1 * | 8/2002 | O'Shea et al. ............. 375/326 |
| 6,563,859 B1 * | 5/2003 | Oishi et al. ................. 375/148 |
| 6,947,403 B1 * | 9/2005 | Heikkila et al. ............ 370/335 |
| 2001/0014114 A1 * | 8/2001 | Baltersee et al. ........... 375/148 |
| 2004/0042537 A1 * | 3/2004 | Frank .......................... 375/152 |
| 2004/0116077 A1 * | 6/2004 | Lee et al. .................... 455/101 |

* cited by examiner

*Primary Examiner*—Tesfaldet Bocure
*Assistant Examiner*—Vineeta Panwalkar
(74) *Attorney, Agent, or Firm*—Volpe and Koenig, P.C.

(57) ABSTRACT

A method and apparatus for reducing the processing rate when performing chip-level equalization (CLE) in a code division multiple access (CDMA) receiver which includes an equalizer filter. Signals received by at least one antenna of the receiver are sampled at M times the chip rate. Each sample stream is split into M sample data streams at the chip rate. Multipath combining is preferably performed on each split sample data stream. The sample data streams are then combined into one combined sample data stream at the chip rate. The equalizer filter performs equalization on the combined sample stream at the chip rate. Filter coefficients are adjusted by adding a correction term to the filter coefficients utilized by the equalizer filter for a previous iteration.

38 Claims, 5 Drawing Sheets

METHOD AND APPARATUS FOR REDUCING THE PROCESSING RATE OF A CHIP-LEVEL EQUALIZATION RECEIVER

CROSS REFERENCE TO RELATED APPLICATION

This application claims the benefit of U.S. provisional application No. 60/625,870 filed Nov. 8, 2004, which is incorporated by reference as if fully set forth.

FIELD OF THE INVENTION

The present invention relates to a code division multiple access (CDMA) receiver. More particularly, the present invention relates to a method and apparatus for reducing the processing rate when performing chip-level equalization (CLE) in the CDMA receiver.

BACKGROUND

Chip-level equalizers are suitable candidates for CDMA receivers, such as those used in wireless transmit/receive units (WTRUs) and base stations. A normalized least mean square (NLMS)-based CLE receiver offers superior performance for high data rate services such as high speed downlink packet access (HSDPA) over a Rake receiver. A typical NLMS receiver consists of an equalizer filter and an NLMS algorithm. The equalizer filter is typically a finite impulse response (FIR) filter.

The NLMS algorithm is used as the tap coefficients generator. It generates appropriate tap coefficients used by the equalizer filter and updates them appropriately and iteratively in a timely basis. Typically, tap coefficients generation includes the error signal computation, vector norm calculation and leaky integration to generate and update the tap coefficients.

The high complexity of the CLE is due to the over-sampling processing in the CLE. A typical CLE includes equalizer filtering, tap-weight vector updating, vector norm square computing, or the like, which all operate at two or more times the chip rate. Two times the chip rate over-sampling processing induces twice as much complexity as the chip rate non-over-sampling processing in the equalizer filter.

SUMMARY

The present invention is related to a method and apparatus for reducing the processing rate when performing CLE in a CDMA receiver which includes an equalizer filter. Signals received by at least one antenna of the receiver are sampled at M times the chip rate, where M is a positive integer. Each sample stream is split into M sample data streams at the chip rate. Multipath combining is preferably performed on each split sample data stream. The sample data streams are then combined into one combined sample data stream at the chip rate. The equalizer filter performs equalization on the combined sample stream at the chip rate. Filter coefficients are adjusted by adding a correction term to the filter coefficients utilized by the equalizer filter for a previous iteration.

BRIEF DESCRIPTION OF THE DRAWINGS

A more detailed understanding of the invention may be had from the following description, given by way of example and to be understood in conjunction with the accompanying drawings wherein.

DETAILED DESCRIPTION OF THE PREFERRED EMBODIMENTS

The preferred embodiments will be described with reference to the drawing figures where like numerals represent like elements throughout.

Hereafter, the terminology "WTRU" includes but is not limited to a user equipment (UE), a mobile station, a laptop, a personal data assistant (PDA), a fixed or mobile subscriber unit, a pager, or any other type of device capable of operating in a wireless environment. When referred to hereafter, the terminology "base station" includes but is not limited to an access point (AP), a Node-B, a site controller or any other type of interfacing device in a wireless environment.

The features of the present invention may be incorporated into an integrated circuit (IC) or be configured in a circuit comprising a multitude of interconnecting components.

Hereafter, the present invention will be explained with reference to an NLMS algorithm. However, it should be noted that any type of adaptive equalization or filtering, such as least mean square (LMS), Griffith's algorithm, channel estimation based NLMS (CE-NLMS), and other iterative or recursive algorithms may be used.

Figure 1:
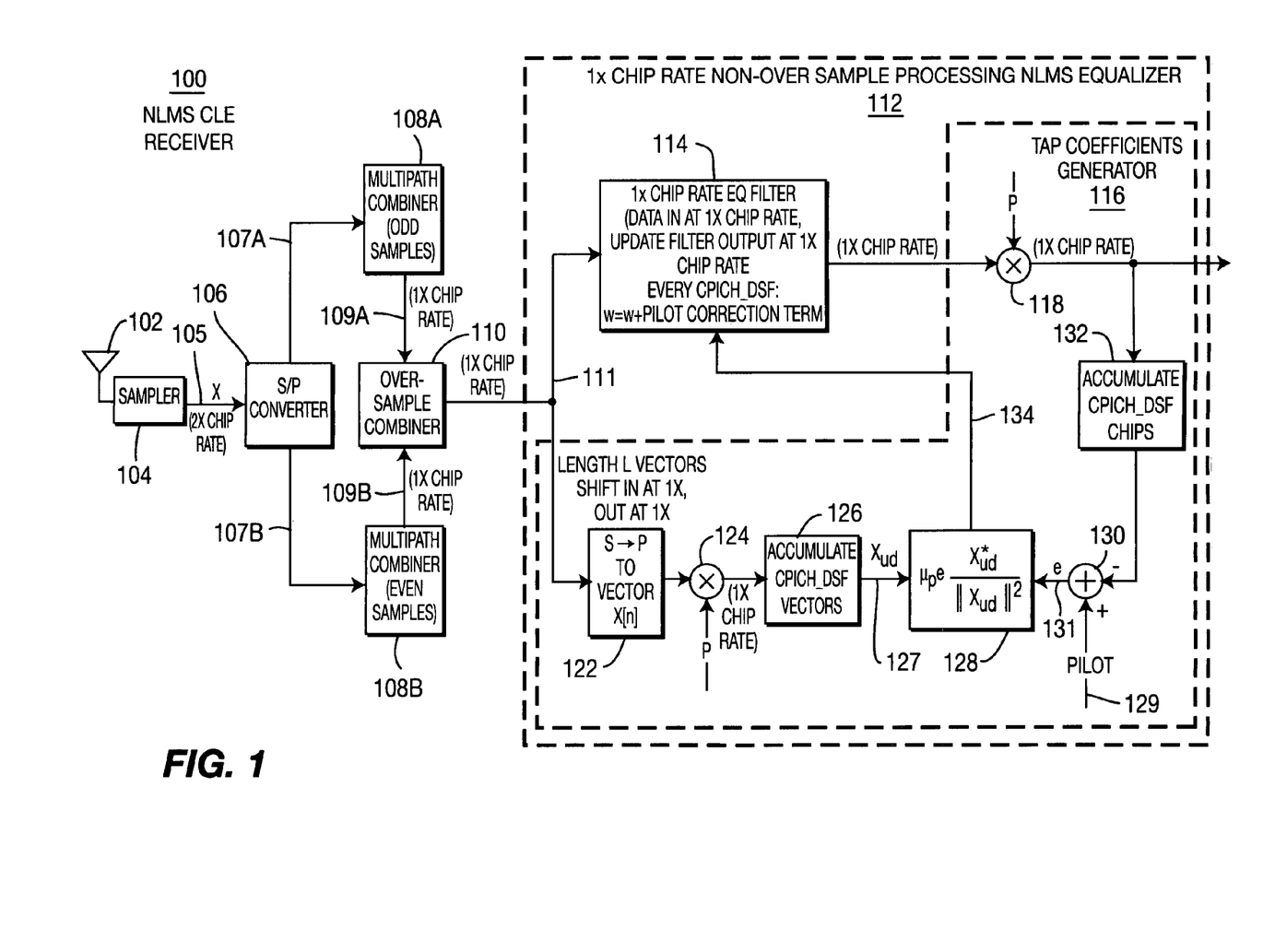
FIG. 1 is a block diagram of an exemplary CDMA receiver configured in accordance with a first embodiment of the present invention.

FIG. 1 is a block diagram of an exemplary CDMA receiver 100 configured in accordance with a first embodiment of the present invention. The CDMA receiver 100 includes at least one antenna 102, a sampler 104, a serial-to-parallel (S/P) converter 106, two multipath combiners 108A, 108B, an over-sample combiner 110 and a 1× chip rate non-over-sample processing NLMS equalizer 112. The NLMS equalizer 112 includes an equalizer filter 114 and a taps coefficients generator 116.

Signals are received by the antenna 102 and are sampled by the sampler 104 at twice the chip rate. The sampler 104 outputs a sample data stream 105, which is split into an odd sample data stream 107A and an even sample data stream 107B by the S/P converter 106. Therefore, the chip rate of signals output by the S/P converter 106 is one times (1×) the chip rate.

The even and odd sample data streams 107A, 107B are fed into respective ones of the multipath combiners 108A, 108B. Multipath is the signal spread in the time domain due to reflection of signal from objects. The same signal may arrive at the receiver at different times, (due to reflection), either early or late, (depending on the reflection distances), and with different amplitudes and phases due to fading. The multipath combiners 108A, 108B collect and combine an original signal with their delayed spread signal (multipath signal or delayed replicates) to improve the reception quality. Each of the sample data streams 107A, 107B has one sample stream and one or more delayed sample streams. The number of delayed sample data streams depends on the number of multipaths that the original signal experienced.

The multipath combiners 108A, 108B combine the multipath or delayed replicates of the signal data streams 107A, 107B. Maximum ratio combining (MRC) may be used for multipath combining. The multipath combined signal data streams 109A, 109B output by the respective multipath combiners 108A, 108B are then fed to an over-sample combiner 110.

The over-sample combiner 110 combines the multipath combined signal streams 109A, 109B and produces one combined sample data stream 111 at one times (1×) the chip rate. The combined sample stream 111 is fed into the equalizer filter 114 and the taps coefficients generator 116.

A matched filter (MF) may be used as the multipath combiners 108A, 108B and the over-sample combiner 110.

The parameters $\vec{x}_n^{i,o}$, $\vec{x}_n^{i,e}$ and $H^{i,o}$, $H^{i,e}$ are denoted as a received signal vector and a channel response matrix for odd and even over-sampled sequences, respectively. The vector $\vec{x}_{n,co}$ is denoted as a combined signal vector after the multipath and over-sample combining. Assuming that a matched filter is used for multipath and over-sample combining, the combined signal can be expressed as follows:

$$\vec{x}_{n,co} = H^{1,o^H}\vec{x}_n^{1,o} + H^{1,e^H}\vec{x}_n^{1,e} + H^{2,o^H}\vec{x}_n^{2,o} + H^{2,e^H}\vec{x}_n^{2,e}.$$  Equation (1)

After the signal combining is performed, one improved signal stream 111 is formed and is fed to the equalizer filter 114 to perform equalization to remove interference such as inter-symbol interference (ISI) and multiple access interference (MAI). The equalizer filter 114 is preferably a finite impulse response (FIR) filter comprising a tap-delay line with tap coefficients of L taps. The NLMS equalizer 112 may be described in terms of weight updates as follows:

$$\vec{w}_{n+1,co} = \alpha \cdot \vec{w}_{n,co} + \mu \frac{\vec{x}_{n,co}^*}{\|x_{n,co}\|^2}(d[n] - \vec{x}_{n,co}^T \vec{w}_{n,co}),$$  Equation (2)

where $\vec{w}_{n,co}$ is the tap-weight vector and d[n] is the reference signal at time n.

In accordance with the present invention, the equalizer filter 114 operates at 1× chip rate and does not have over-sampling processing. Therefore, the number of taps of the equalizer filter 114 is smaller than that is required in a prior art equalizer filter with 2× chip rate processing. The equalizer filter 114 requires only half of the number of taps in the 2× chip rate equalizer filter.

The tap coefficients generator 116 includes multipliers 118, 124, an adder 130, a serial-to-parallel (S→P) to vector converter 122, a vector accumulator 126, a correction term generator 128 and a chips accumulator 132. The output from the equalizer filter 114 is descrambled via the multiplier 118. The output of the multiplier 118 is accumulated by the chips accumulator 132 for a predetermined period, (e.g., for chips equal to a common pilot channel (CPICH) despreading factor). The accumulated result output by the chips accumulator 132 is subtracted from a reference pilot signal 129 via the adder 130 to generate an error signal 131, represented by a variable e, which is used by the correction term generator 128 to generate correction terms 134.

The combined input sample data stream 111 is converted to length L vectors by the S→P to vector converter 122 and descrambled by the multiplier 124. The descrambled input vectors are accumulated for a predetermined period, (e.g., for chips equal to a CPICH despreading factor) by the vectors accumulator 126 to generate update vectors 127. The update vectors 127 are forwarded to the correction term generator 128. To generate correction terms for tap coefficient updates, the inputs for $\mu_P$, e, $X_{ud}$ are required. $\mu_P$ is the step size. e is the error signal which is the differential signal between an equalized signal and a reference signal, which typically is used in the form of a pilot signal. $X_{ud}$ is the received signal after descrambling and despreading. $\|X_{ud}\|^2$ is the norm of the descrambled and despread signal $X_{ud}$. Equation (2) is used for iteration algorithm and tap coefficient updates.

The correction term generator 128 may generate the correction terms 134 based on the correction term $$\mu_P \cdot e \cdot \frac{X_{ud}^*}{\|X_{ud}\|^2}$$

which is added, in the equalizer filter 114, to the filter coefficients of the previous iteration to generate updated filter coefficients for the next iteration.

Alternatively, the correction term generator 128 may generate the correction terms 134 based on the correction term $$\mu_P \cdot e \cdot \frac{X_{ud}^*}{\|X_{ud}\|^2 + \eta}.$$

The variable η is a relatively small number that is used to improve the numerical properties and prevent the fixed-point computation from overflow when the correction term is generated.

Figure 2:
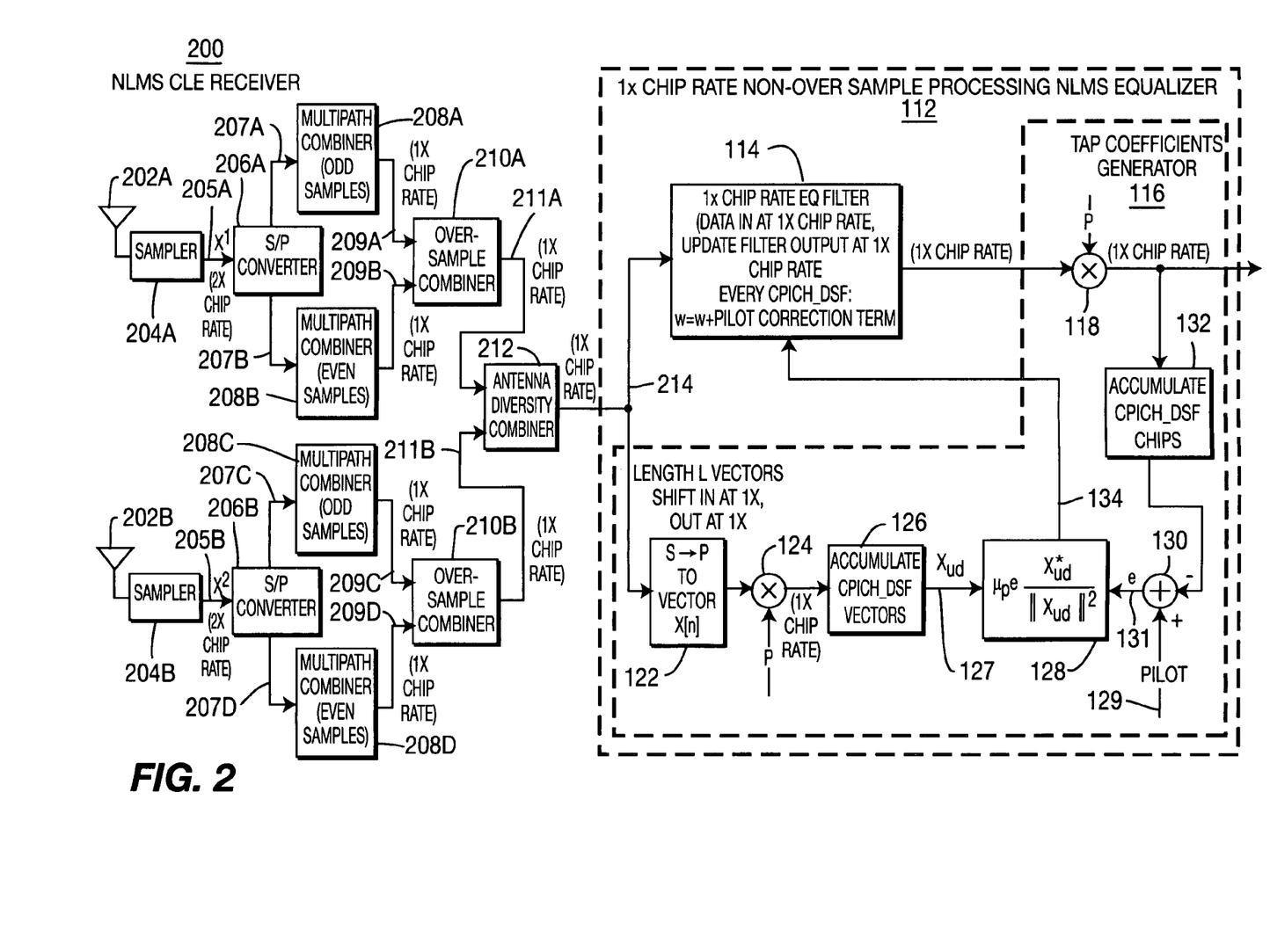
FIG. 2 is a block diagram of an exemplary CDMA receiver configured in accordance with a second embodiment of the present invention.

FIG. 2 is a block diagram of an exemplary CDMA receiver 200 configured in accordance with a second embodiment of the present invention. The CDMA receiver 200 includes two antennas 202A, 202B, two samplers 204A, 204B, two S/P converters 206A, 206B, four multipath combiners 208A, 208B, 208C, 208D, two over-sample combiners 210A, 210B, an antenna diversity combiner 212 and the 1× chip rate non-over-sample processing NLMS equalizer 112 described above with respect to FIG. 1.

Signals are received by the antennas 202A, 202B and are respectively sampled by the samplers 204A, 204B at twice (2×) the chip rate. The sampler 204A outputs a sample data stream 205A, which is split into an odd sample data stream 207A and an even sample data stream 207B by the S/P converter 206A at one times (1×) the chip rate. The sampler 204B outputs a sample data stream 205B, which is split into an odd sample data stream 207C and an even sample data stream 207D by the S/P converter 206B at one times (1×) the chip rate.

The odd sample data stream 207A and the even sample data stream 207B are fed into respective ones of the multipath combiners 208A, 208B. The multipath combiners 208A, 208B respectively combine the multipath or delayed replicates of the signal data streams 207A, 207B. Maximum ratio combining (MRC) may be used for multipath combining. The multipath combined signal data streams 209A, 209B are output by the respective multipath combiners 208A, 208B at one times (1×) the chip rate and are then fed to an over-sample combiner 210A. The over-sample combiner 210A combines the multipath combined signal streams 209A, 209B and produces a first combined sample data stream 211A at one times (1×) the chip rate.

The odd sample data stream 207C and the even sample data stream 207D are fed into respective ones of the multipath combiners 208C, 208D. The multipath combiners 208C, 208D respectively combine the multipath or delayed replicates of the signal data streams 207C, 207D. MRC may be used for multipath combining. The multipath combined signal data streams 209C, 209D are output by the respective multipath combiners 208C, 208D at one times (1×) the chip rate and are then fed to an over-sample combiner 210B. The over-sample combiner 210B combines the multipath combined signal streams 209C, 209D and produces a second combined sample data stream 211B at one times (1×) the chip rate.

The combined sample data stream 211A and 211B are combined by the antenna diversity combiner 212, and the combined output 214 of the antenna diversity combiner 212 is fed into the equalizer filter 114 and the taps coefficients generator 116 of the 1× chip rate non-over-sample processing NLMS equalizer 112.

Figures 3, 3A:
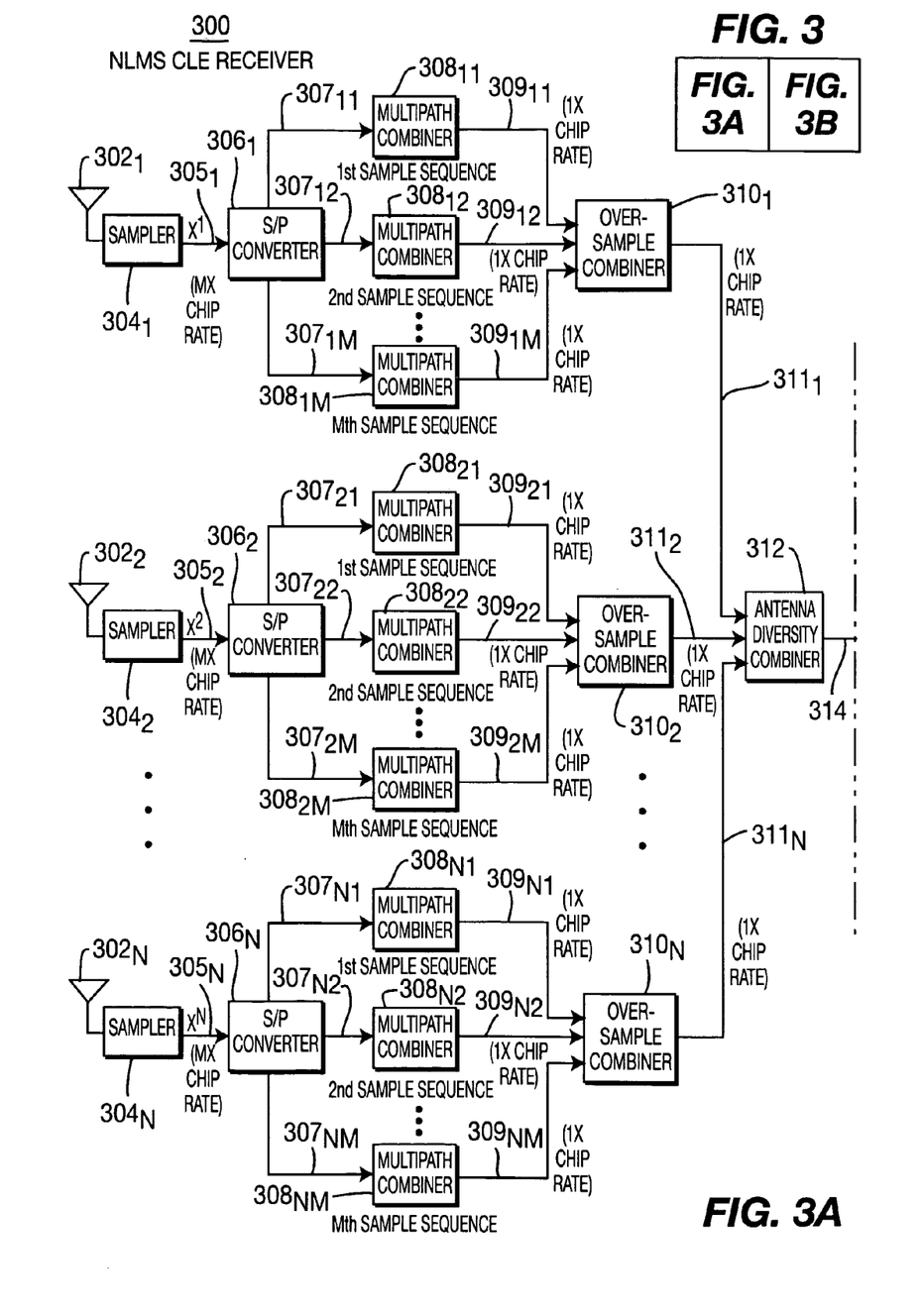
FIGS. 3A and 3B, taken together, are a block diagram of an exemplary CDMA receiver configured in accordance with a third embodiment of the present invention.
Figure 3B:
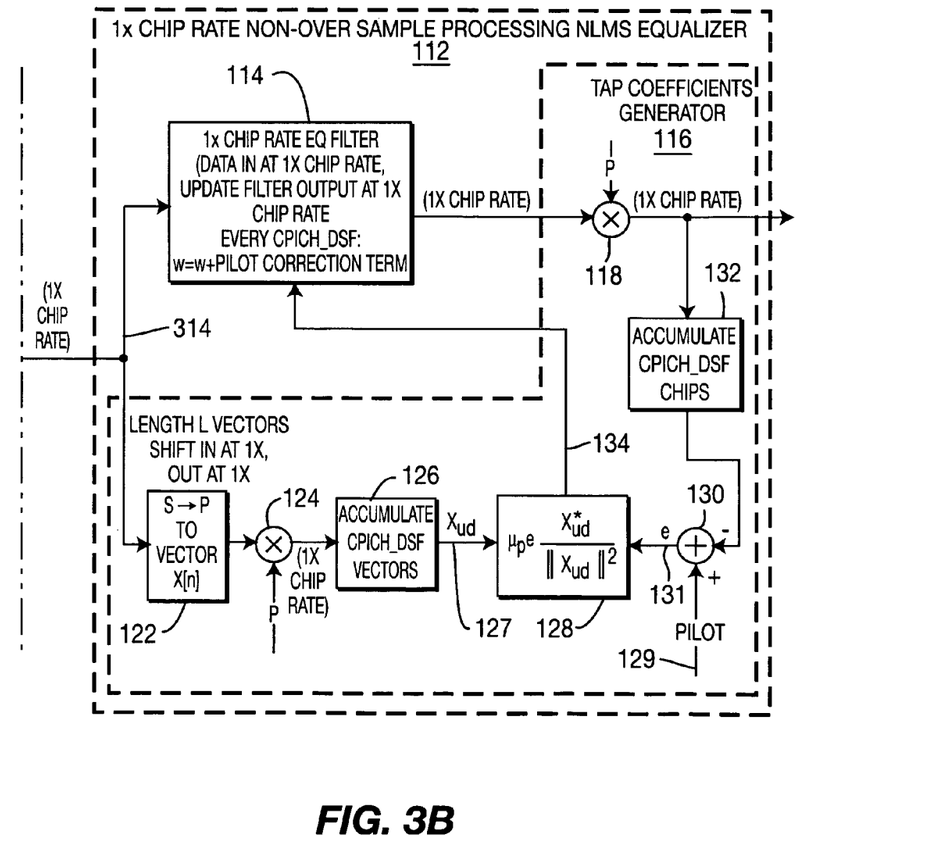

FIGS. 3A and 3B, taken together, are a block diagram of an exemplary CDMA receiver 300 configured in accordance with a third embodiment of the present invention. The third embodiment is an extension of the first and second embodiments to N antennas and M×oversampling, where N and M are positive integers. The CDMA receiver 300 includes N antennas $302_1$–$302_N$, N samplers $304_1$–$304_N$, N S/P converters $306_1$–$306_N$, (i.e., splitters), N×M multipath combiners $308_{11}$–$308_{NM}$, N over-sample combiners $310_1$–$310_N$, an antenna diversity combiner 312 and the 1× chip rate non-over-sample processing NLMS equalizer 112 described above with respect to FIG. 1.

Signals are received by the antennas $302_1$–$302_N$ and are respectively sampled by the samplers $304_1$–$304_N$ at M times (M×) the chip rate, (i.e., $1^{st}$ sample sequence, $2^{nd}$ sample sequence, . . . , the Mth sample sequence).

In response to receiving a signal from the antenna $302_1$, the sampler $304_1$ generates a sample data stream $305_1$ which is split into M sample sequences $307_{11}$–$307_{1M}$ by the S/P converter $306_1$, (i.e., a splitter), at one times (1×) the chip rate. The multipath components of each respective M sample sequence $307_{11}$–$307_{1M}$ are combined by a respective one of the multipath combiners $308_{11}$–$308_{1M}$ which generates a respective over-sampled stream $309_{11}$–$309_{1M}$ that is fed to the over-sample combiner $310_1$. The over-sample combiner $310_1$ combines the over-sampled streams $309_{11}$–$309_{1M}$ into a combined over-sampled stream $311_1$ which is then fed to the antenna diversity combiner 312.

In response to receiving a signal from the antenna $302_2$, the sampler $304_2$ generates a sample data stream $305_2$ which is split into M sample sequences $307_{21}$–$307_{2M}$ by the S/P converter $306_2$, (i.e., a splitter), at one times (1×) the chip rate. All multipath components of each respective M sample sequence $307_{21}$–$307_{2M}$ are combined by a respective one of the multipath combiners $308_{21}$–$308_{2M}$ which, generates a respective over-sampled stream $309_{21}$–$309_{2M}$ that is fed to the over-sample combiner $310_2$. The over-sample combiner $310_2$ combines the over-sampled streams $309_{21}$–$309_{2M}$ into a combined over-sampled stream $311_2$ which is fed to the antenna diversity combiner 312.

In response to receiving a signal from the antenna $302_N$, the sampler $304_N$ generates a sample data stream $305_N$ which is split into M sample sequences $307_{N1}$–$307_{NM}$ by the S/P converter $306_N$, (i.e., a splitter), at one times (1×) the chip rate. All multipath components of each respective M sample sequence $307_{N1}$–$307_{NM}$ are combined by a respective one of the multipath combiners $308_{N1}$–$308_{NM}$ which generates a respective over-sampled stream $309_{N1}$–$309_{NM}$ that is fed to the over-sample combiner $310_N$. The over-sample combiner $310_N$ combines the over-sampled streams $309_{N1}$–$309_{NM}$ into a combined over-sampled stream $311_N$ which is then fed to the antenna diversity combiner 312.

The antenna diversity combiner 312 combines the combined over-sampled streams $311_1$–$311_N$ into an antenna diversity sample data stream 314 at chip rate. The antenna diversity sample data stream 314 is input to the equalizer filter 114 and the taps coefficients generator 116 of the 1× chip rate non-over-sample processing NLMS equalizer 112.

The foregoing description is related to a despread pilot-directed receiver. As an alternative, the receiver may be a non-despread pilot-directed receiver. In such case, no accumulation of the descrambled samples is performed.

Figure 4:
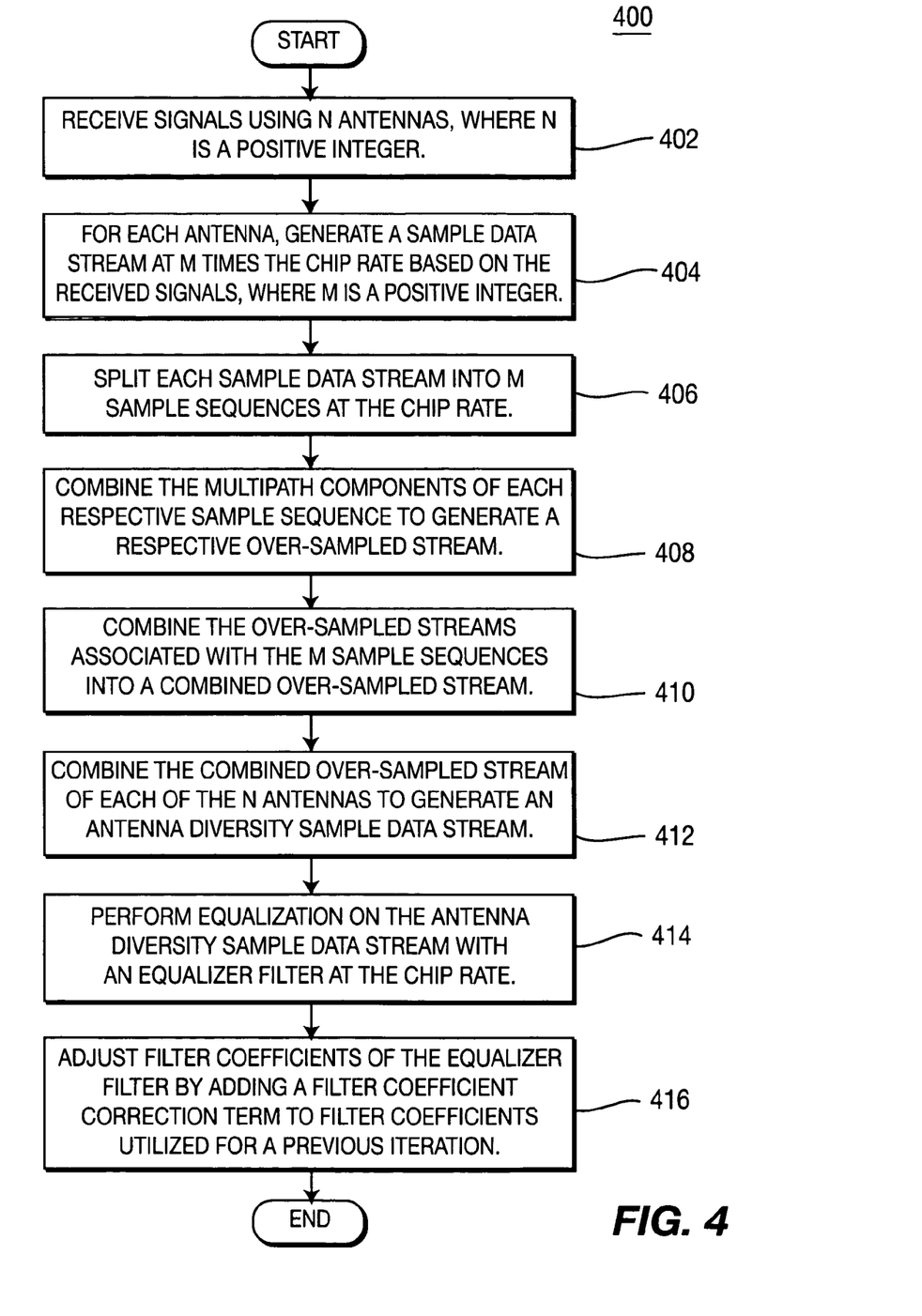
FIG. 4 is a flow diagram of a process for implementing non-over-sampling processing in a CDMA receiver in accordance with the present invention.

FIG. 4 is a flow diagram of a process 400 including method steps for implementing non-over-sampling processing in accordance with the present invention. In step 402, signals are received using N antennas $302_1$–$302_N$, where N is a positive integer. In step 404, a sample data stream $305_1$–$305_N$ is generated for each of the N antennas $302_1$–$302_N$ at M times the chip rate based on the received signals, where M is a positive integer. In step 406, each sample data stream $305_1$–$305_N$ is split into M sample sequences $307_{11}$–$307_{1M}$, $307_{21}$–$307_{2M}$, $307_{N1}$–$307_{NM}$ at the chip rate. In step 408, the multipath components of each respective sample sequence $307_{11}$–$307_{1M}$, $307_{21}$–$305_{2M}$, $307_{N1}$–$305_{NM}$ are combined to generate a respective over-sampled stream $309_{11}$–$309_{1M}$, $309_{21}$–$309_{2M}$, $309_{N1}$–$309_{NM}$. In step 410, the over-sampled streams $309_{11}$–$309_{1M}$, $309_{21}$–$309_{2M}$, $309_{N1}$–$309_{NM}$ associated with the M sample sequences $307_{11}$–$307_{1M}$, $307_{21}$–$307_{2M}$, $307_{N1}$–$307_{NM}$ are combined to generate a combined over-sampled stream $311_1$–$311_N$. In step 412, the combined over-sampled streams $311_1$–$311_N$ of the N antennas are combined to generate an antenna diversity sample data stream 314. In step 414, equalization is performed on the antenna diversity sample data stream 314 with an equalizer filter 114 at the chip rate. In step 416, filter coefficients of the equalizer filter are adjusted by adding a filter coefficient correction term 134 to the filter coefficients utilized for a previous iteration. The filter coefficient correction term 134 is generated in accordance with an error signal 131 which is generated by comparing an output from the equalizer filter with a reference signal.

While the present invention has been described in terms of the preferred embodiment, other variations which are within the scope of the invention as outlined in the claims below will be apparent to those skilled in the art.

What is claimed is:

1. A code division multiple access (CDMA) receiver comprising:
    (a) an antenna for receiving signals;
    (b) a sampler coupled to the antenna and generating a sample data stream at M times chip rate based on the received signals, wherein M is a positive integer;
    (c) a serial-to-parallel (S/P) converter, the S/P converter being coupled to the sampler for splitting the sample data stream into M sample streams at the chip rate;
    (d) a combiner for combining the split sample streams into one combined sample data stream at the chip rate;
    (e) an equalizer for processing the one combined sample data stream at the chip rate; and (f) a plurality of multipath combiners for combining multipath or delayed replicates of each sample data stream output from the S/P converter.

2. The receiver of claim 1 wherein the equalizer (e) comprises:
(e1) an equalizer filter for processing the one combined sample data stream with filter coefficients; and
(e2) a tap coefficients generator for generating at least one filter coefficient correction term for use by the equalizer filter.

3. The receiver of claim 1 wherein M is equal to 2, and the S/P converter splits the sample data stream into an odd sample data stream and an even data sample stream.

4. The receiver of claim 2 wherein the filter coefficient correction term is generated based on a despread pilot sequence.

5. The receiver of claim 2 wherein the filter coefficient correction term is generated based on a non-despread pilot sequence.

6. The receiver of claim 2 wherein the tap coefficients generator generates the filter coefficient correction term using a normalized least mean square (NLMS) algorithm.

7. The receiver of claim 2 wherein the tap coefficients generator generates the filter coefficient correction term using a least mean square (LMS) algorithm.

8. A code division multiple access (CDMA) receiver comprising:
(a) a plurality of antennas for receiving signals;
(b) a plurality of samplers for generating a sample data stream at M times chip rate based on the received signals, wherein M is a positive integer and each sampler is associated with a particular one of the antennas;
(c) a plurality of splitters for splitting the sample data stream into M sample sequences at the chip rate, each splitter being coupled to a respective one of the samplers;
(d) a plurality of multipath combiners for combining the multipath components of each respective sample sequence to generate a respective over-sampled stream each multipath combiner being configured to receive a respective one of the over-sampled streams;
(e) a plurality of over-sampling combiners for combining the over-sampled streams associated with the sample sequences generated by a respective one of the splitters into a combined over-sampled stream;
(f) an antenna diversity combiner for combining the combined over-sampled stream of each of the antennas to generate an antenna diversity sample data stream; and
(g) an equalizer for equalizing the antenna diversity sample data stream at the chip rate.

9. The receiver of claim 8 wherein the equalizer (g) comprises:
(g1) an equalizer filter for processing the one combined sample data stream with filter coefficients; and
(g2) a tap coefficients generator for generating at least one filter coefficient correction term for use by the equalizer filter.

10. The receiver of claim 9 wherein the filter coefficient correction term is generated based on a despread pilot sequence.

11. The receiver of claim 9 wherein the filter coefficient correction term is generated based on a non-despread pilot sequence.

12. The receiver of claim 9 wherein the tap coefficients generator generates the filter coefficient correction term using a normalized least mean square (NLMS) algorithm.

13. The receiver of claim 9 wherein the tap coefficients generator generates the filter coefficient correction term using a least mean square (LMS) algorithm.

14. The receiver of claim 8 wherein the splitters are serial-to-parallel (S/P) converters.

15. In a code division multiple access (CDMA) receiver including an equalizer filter and N antennas, a method of reducing the processing rate when performing chip-level equalization (CLE) in the CDMA receiver, the method comprising:
(a) receiving signals using the N antennas, where N is a positive integer;
(b) for each of the N antennas, generating a sample data stream at M times chip rate based on the received signals, wherein M is a positive integer;
(c) splitting the sample data stream into M sample sequences at the chip rate;
(d) combining the multipath components of each respective sample sequence to generate a respective over-sampled stream;
(e) combining the over-sampled streams associated with the sample sequences into a combined over-sampled stream; and
(f) combining the combined over-sampled stream of each of the N antennas to generate an antenna diversity sample data stream.

16. The method of claim 15 further comprising:
(g) performing equalization on the antenna diversity sample data stream with the equalizer filter at the chip rate; and
(h) adjusting filter coefficients of the equalizer filter by adding a filter coefficient correction term to filter coefficients utilized for previous iteration.

17. The method of claim 16 wherein the filter coefficient correction term is generated based on despread pilot sequence.

18. The method of claim 16 wherein the filter coefficient correction term is generated based on non-despread pilot sequence.

19. The method of claim 16 wherein the filter coefficient correction term is generated using a normalized least mean square (NLMS) algorithm.

20. The method of claim 16 wherein the filter coefficient correction term is generated using a least mean square (LMS) algorithm.

21. An integrated circuit (IC) used in conjunction with a code division multiple access (CDMA) receiver having an antenna for receiving signals, the IC comprising:
(a) a sampler coupled to the antenna and generating a sample data stream at M times chip rate based on the received signals, wherein M is a positive integer;
(b) a serial-to-parallel (S/P) converter, the S/P converter being coupled to the sampler for splitting the sample data stream into M sample streams at the chip rate;
(c) a combiner for combining the split sample streams into one combined sample data stream at the chip rate;
(d) an equalizer for processing the one combined sample data stream at the chip rate; and
(e) a plurality of multipath combiners for combining multipath or delayed replicates of each sample data stream output from the S/P converter.

22. The IC of claim 21 wherein the equalizer (d) comprises:
(d1) an equalizer filter for processing the one combined sample data stream with filter coefficients; and
(d2) a tap coefficients generator for generating at least one filter coefficient correction term for use by the equalizer filter.

23. The IC of claim 21 wherein M is equal to 2, and the S/P converter splits the sample data stream into an odd sample data stream and an even data sample stream.

24. The IC of claim 22 wherein the filter coefficient correction term is generated based on a despread pilot sequence.

25. The IC of claim 22 wherein the filter coefficient correction term is generated based on a non-despread pilot sequence.

26. The IC of claim 22 wherein the tap coefficients generator generates the filter coefficient correction term using a normalized least mean square (NLMS) algorithm.

27. The IC of claim 22 wherein the tap coefficients generator generates the filter coefficient correction term using a least mean square (LMS) algorithm.

28. The IC of claim 21 wherein the IC and the CDMA receiver are incorporated in a wireless transmit/receive unit (WTRU).

29. The IC of claim 21 wherein the IC and the CDMA receiver are incorporated in a base station.

30. An integrated circuit (IC) used in conjunction with a code division multiple access (CDMA) receiver having N antennas for receiving signals, the IC comprising:
(a) a plurality of samplers for generating a sample data stream at M times chip rate based on the received signals, wherein M is a positive integer and each sampler is associated with a particular one of the antennas;
(b) a plurality of splitters for splitting the sample data stream into M sample sequences at the chip rate, each splitter being coupled to a respective one of the samplers;
(c) a plurality of multipath combiners for combining the multipath components of each respective sample sequence to generate a respective over-sampled stream each multipath combiner being configured to receive a respective one of the over-sampled streams;
(d) a plurality of over-sampling combiners for combining the over-sampled streams associated with the sample sequences generated by a respective one of the splitters into a combined over-sampled stream;
(e) an antenna diversity combiner for combining the combined over-sampled stream of each of the N antennas to generate an antenna diversity sample data stream; and
(f) an equalizer for equalizing the antenna diversity sample data stream at the chip rate.

31. The IC of clain 30 wherein the equalizer (f) comprises:
(f1) an equalizer filter for processing the one combined sample data stream with filter coefficients; and
(f2) a tap coefficients generator for generating at least one filter coefficient correction term for use by the equalizer filter.

32. The IC of claim 31 wherein the filter coefficient correction term is generated based on a despread pilot sequence.

33. The IC of claim 31 wherein the filter coefficient correction term is generated based on a non-despread pilot sequence.

34. The IC of claim 31 wherein the tap coefficients generator generates the filter coefficient correction term using a normalized least mean square (NLMS) algorithm.

35. The IC of claim 31 wherein the tap coefficients generator generates the filter coefficient correction term using a least mean square (LMS) algorithm.

36. The IC of claim 30 wherein the splitters are serial-to-parallel (S/P) converters.

37. The IC of claim 30 wherein the IC and the CDMA receiver are incorporated in a wireless transmit/receive unit (WTRU).

38. The IC of claim 30 wherein the IC and the CDMA receiver are incorporated in a base station.

* * * * *

UNITED STATES PATENT AND TRADEMARK OFFICE
CERTIFICATE OF CORRECTION

PATENT NO. : 7,116,705 B2
APPLICATION NO. : 11/210591
DATED : October 3, 2006
INVENTOR(S) : Jung-Lin Pan It is certified that error appears in the above-identified patent and that said Letters Patent is hereby corrected as shown below:

At column 2, line 65, after the word "delayed", delete "replicates" and insert therefor --replicas--.

At column 3, line 4, after the word "delayed", delete "replicates" and insert therefor --replicas--.

At column 3, lines 26-27, delete Equation (1) and insert therefor

-- $\vec{x}_{n,co} = H^{1,o^H} \vec{x}^{1,o}{}_n + H^{1,e^H} \vec{x}^{1,e}{}_n + H^{2,o^H} \vec{x}^{2,o}{}_n + H^{2,e^H} \vec{x}^{2,e}{}_n.$ --.

At column 3, line 49, after the word "than", delete "that" and insert therefor --what--.

At column 4, line 63, before the words "of the", delete "replicates" and insert therefor --replicas--.

Signed and Sealed this

Twenty-first Day of August, 2007

JON W. DUDAS
*Director of the United States Patent and Trademark Office*

UNITED STATES PATENT AND TRADEMARK OFFICE
CERTIFICATE OF CORRECTION

PATENT NO. : 7,116,705 B2
APPLICATION NO. : 11/210591
DATED : October 3, 2006
INVENTOR(S) : Jung-Lin Pan Page 1 of 1

It is certified that error appears in the above-identified patent and that said Letters Patent is hereby corrected as shown below:

At column 5, line 9, before the words "of the", delete "replicates" and insert therefor --replicas--.

At column 6, line 30, after "30711-3071M,", delete "30721-3052M," and insert therefor --30721-3072M,--.

At column 6, line 31, before the words "are combined", delete "307N1-305NM" and insert therefor --307N1-307NM--.

IN THE CLAIMS

At claim 21, column 8, line 66, after the word "delayed", delete "replicates" and insert therefor --replicas--.

Signed and Sealed this

Fifteenth Day of April, 2008

JON W. DUDAS
*Director of the United States Patent and Trademark Office*